(12) United States Patent
Heimbach

(10) Patent No.: US 11,293,208 B2
(45) Date of Patent: Apr. 5, 2022

(54) FIXED BIN HINGE SYSTEM

(71) Applicant: SAFRAN CABIN INC., Huntington Beach, CA (US)

(72) Inventor: Eric Heimbach, Huntington Beach, CA (US)

(73) Assignee: SAFRAN CABIN INC., Huntington Beach, CA (US)

(*) Notice: Subject to any disclaimer, the term of this patent is extended or adjusted under 35 U.S.C. 154(b) by 0 days.

(21) Appl. No.: 16/341,032

(22) PCT Filed: Apr. 2, 2019

(86) PCT No.: PCT/US2019/025355
§ 371 (c)(1),
(2) Date: Apr. 10, 2019

(87) PCT Pub. No.: WO2019/195265
PCT Pub. Date: Oct. 10, 2019

(65) Prior Publication Data
US 2021/0040786 A1 Feb. 11, 2021

Related U.S. Application Data

(60) Provisional application No. 62/652,811, filed on Apr. 4, 2018.

(51) Int. Cl.
B64D 11/00 (2006.01)
E05F 1/12 (2006.01)
(Continued)

(52) U.S. Cl.
CPC ............ E05F 3/224 (2013.01); B64D 11/003 (2013.01); E05D 3/125 (2013.01); E05F 3/20 (2013.01); E05Y 2900/502 (2013.01)

(58) Field of Classification Search
CPC .......... E05D 3/142; E05D 3/125; E05D 3/02; E05D 3/18; E05D 7/08; E05D 7/081;
(Continued)

(56) References Cited

U.S. PATENT DOCUMENTS 3,979,573 A 9/1976 Burns
4,383,347 A * 5/1983 La Conte ............. B64D 11/003
16/360
(Continued)

FOREIGN PATENT DOCUMENTS

WO 2018116084 A1 6/2018
WO WO-2018116084 A1 * 6/2018 ............ E05F 1/1091
WO WO-2019195265 A1 * 10/2019 ................ E05F 3/20

OTHER PUBLICATIONS

International Search Report and Written Opinion issued in PCT/US2019/025355.

Primary Examiner — Emily M Morgan
(74) Attorney, Agent, or Firm — Jeffer Mangels Butler & Mitchell LLP; Brennan C. Swain, Esq.

(57) ABSTRACT

A hinge assembly for an aircraft overhead storage bin that includes a housing having a hinge space and a hinge opening defined therein, an arm pivotably connected to the housing within the hinge space, and a dampener. The hinge opening communicates the hinge space with an exterior of the housing. The arm is pivotable between a closed position and an open position and extends through the hinge opening such that the first end of the arm is positioned outside of the housing. The dampener includes first and second ends. The first end is connected to the housing and the second end is connected to the arm. The dampener biases the arm from the closed position to the open position.

6 Claims, 8 Drawing Sheets

(51) Int. Cl.
  *E05D 3/06* (2006.01)
  *E05D 15/32* (2006.01)
  *E05F 3/22* (2006.01)
  *E05D 3/12* (2006.01)
  *E05F 3/20* (2006.01)

(58) Field of Classification Search
  CPC ....... E05D 11/10; E05D 15/262; E05D 15/46;
    E05D 15/04; E05D 15/463; E05D 3/06;
    E05D 15/32; B64D 11/003; B64D 11/00;
    E05Y 2900/502; E05Y 2900/20; E05F
    3/224; E05F 3/30; E05F 3/20; E05F 1/12;
    E06B 3/385
  USPC ................ 312/326, 327, 248, 325, 319.2
  See application file for complete search history.

(56) References Cited

U.S. PATENT DOCUMENTS

| | | | |
|---|---|---|---|
| 5,035,471 A * | 7/1991 | Ackerman | B64D 11/003 |
| | | | 312/291 |
| 6,131,242 A | 10/2000 | Zipperle | |
| 6,634,460 B1 * | 10/2003 | Hackenberg | A47F 3/007 |
| | | | 186/38 |
| 9,327,834 B2 | 5/2016 | Paulino | |
| 10,760,315 B2 * | 9/2020 | Chadwell | E05F 1/1292 |
| 10,801,244 B1 * | 10/2020 | Chadwell | E05F 1/1292 |
| 2001/0039762 A1 * | 11/2001 | Giovannetti | E05F 1/1091 |
| | | | 49/246 |
| 2002/0074913 A1 | 6/2002 | Lau | |
| 2004/0140685 A1 | 7/2004 | Bieck | |
| 2005/0264144 A1 * | 12/2005 | Verbeek | E05F 1/1091 |
| | | | 312/323 |
| 2006/0132007 A1 | 6/2006 | Beckley | |
| 2008/0115322 A1 * | 5/2008 | Migli | E05F 1/1091 |
| | | | 16/283 |
| 2008/0216289 A1 * | 9/2008 | Salice | E05D 15/46 |
| | | | 16/366 |
| 2008/0295283 A1 * | 12/2008 | Tice | E05C 19/16 |
| | | | 16/84 |
| 2009/0139055 A1 * | 6/2009 | Salice | E05D 15/262 |
| | | | 16/236 |
| 2010/0127606 A1 * | 5/2010 | Collene | E05F 1/1292 |
| | | | 312/327 |
| 2012/0084944 A1 * | 4/2012 | Hirtsiefer | E05D 3/14 |
| | | | 16/302 |
| 2014/0115823 A1 * | 5/2014 | Lowe | E05F 5/006 |
| | | | 16/85 |
| 2017/0283058 A1 * | 10/2017 | Papke | B64D 11/003 |
| 2019/0017308 A1 * | 1/2019 | Chadwell | E05D 3/06 |
| 2020/0040633 A1 * | 2/2020 | Rheaume | E05D 15/463 |

* cited by examiner

FIXED BIN HINGE SYSTEM

CROSS REFERENCE TO RELATED APPLICATIONS

This application is a national stage application, filed under 35 U.S.C. § 371, of International Patent Application No. PCT/US19/25355 filed Apr. 2, 2019, which claims the benefit of U.S. Provisional Application No. 62/652,811 filed Apr. 4, 2018, the entireties of which are incorporated herein by reference.

FIELD OF THE INVENTION

The present invention relates generally to a hinge system, and more particularly to a hinge system for use in a fixed bin in an aircraft.

BACKGROUND OF THE INVENTION

Many aircraft, including the Airbus A320 and Boeing 737, include fixed overhead storage bins, which are also known as shelf bins. The bins include a hinged door that opens upwardly. Airlines want to optimize bin space to allow passengers to put as much luggage into overhead storage bins as possible. However, as shown in FIG. 1, the hinge mechanisms in current fixed bins take up valuable bin space. Accordingly, a need exists for a fixed bin and accompanying hinge system that maximizes space.

SUMMARY OF THE PREFERRED EMBODIMENTS

In accordance with a first aspect of the present invention there is provided a hinge assembly for an aircraft overhead storage bin that includes a housing having a hinge space and a hinge opening defined therein, an arm pivotably connected to the housing within the hinge space, and a dampener. The hinge opening communicates the hinge space with an exterior of the housing. The arm is pivotable between a closed position and an open position and extends through the hinge opening such that the first end of the arm is positioned outside of the housing. The dampener includes first and second ends. Preferably, the dampener includes a cylinder having a spring or springs, dampening fluid or the like therein and a spring that extends from the cylinder. The dampener overall length of the dampener gets longer or shorter in use. The first end is connected to the housing and the second end is connected to the arm. The dampener biases the arm from the closed position to the open position. In a preferred embodiment, the arm includes a second end opposite the first end and the second end of the dampener is connected to the second end of the arm. The arm is pivotably connected to the housing about a pivot axis and the pivot axis is located between the first and second ends of the arm. The arm includes a second end opposite the first end and the second end of the dampener is connected to the second end of the arm. The arm is pivotably connected to the second housing about a pivot axis.

In a preferred embodiment, the arm is pivotable between the closed position, the open position and an over-travel position. The arm is biased from the over-travel position to the open position. The housing preferably includes a stop member that the arm contacts when the stop member is in the over-travel position. Preferably, the housing includes inner and outer housing members that cooperate to define the hinge space therebetween. The pivot axis is defined by a pivot axle that extends from one of the inner and outer housing members and the stop member is secured to one of the inner and outer housing members. The stop member can be unitary with (monolithically formed with) or attached to the housing member.

In a preferred embodiment, the entire dampener is movable between a normal position and an over-travel position (as opposed to the arm portion of the dampener member extending outwardly or inwardly). The dampener is in the normal position when the arm is in the closed and open position and the dampener is in the over-travel position when the arm is in the over-travel position.

In a preferred embodiment, the stop member is movable between a first stop position and a second stop position. In this embodiment, the stop member is biased to the first stop position. The arm contacts the stop member when the arm is in the open position and the stop member moves to the second stop position when the arm is moved to the over-travel position (where the arm is still in contact with the stop member).

The present invention includes an overhead storage bin that includes a hinge system a with first and second hinge assemblies. Generally, the bin includes a bottom or shelf, first and second side or end panels, a top and a door that is hingedly connected to the bin, and the first and second side panels, in particular. The door includes a latch that cooperates with a catch on the shelf to hold the door in the closed position. Any type of latch system is within the scope of the present invention. As described herein, in a preferred embodiment, the hinge assembly is used in an aircraft overhead storage bin. However, this is not a limitation on the present invention, and the hinge assembly can be used with any type of door or cover that is moveable between a closed and opened position.

The side panels include a cut out or recess therein in which the hinge assembly is received or seated. As a result, the hinge assembly is flush with or almost flush with the inside surface of the side panel of the bin. This provides extra room within the bin interior compared to the prior art.

In a preferred embodiment, the hinge assembly includes inner and outer or first and second housing members that house or sandwich a lever arm and dampener in a hinge space therebetween. The lever arm includes a second end to which the damper is attached and a first end that attaches to the door. The lever arm is pivotally connected to one of the housing members at a pivot axis between the first and second ends. The end of the dampener opposite the lever arm is secured to one of the housing members.

In a preferred embodiment, the hinge assembly is designed to house most or all of the components within the thickness of the side panels. It also includes over travel of the lever arm to enable two open door positions, as described below. These open positions include one normal open angle (similar to the open angle of the prior art) to accommodate ergonomic or normal reach and a second "over rotated" or fully open position to allow for larger content loading.

The door, lever arm and dampener move between a closed position, an open or intermediate position, and a fully open or over-travel position. In the closed position the spring dampener is compressed and is biased toward the intermediate position and is being held in the closed position by the latch engagement of the door on the shelf or bottom of the bin.

The door is moved to the intermediate position when the latch is disengaged from the catch and the spring dampener extends, thereby moving the lever arms and the door to the intermediate position. This position allows for proper ergonomics of reach when closing the door (meaning the average person can reach and close the door). The first end of the lever arm is operationally connected to a slot that captures the ends of and/or provides clearance for the pivotal movement.

The fully open or over-travel position occurs when an oversized bag is loaded or unloaded and pushes the door further open or up (which further pivots the lever arm). A person can also push the door up. The door only moves or pivots to this position when force is applied thereto. Once force is no longer applied, the door returns to the intermediate or open position. This can be achieved by having the dampener attached to a slide mechanism allowing for additional rotation of the lever arm. It can also be achieved by moving the dampener beyond its normal (at rest) position.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
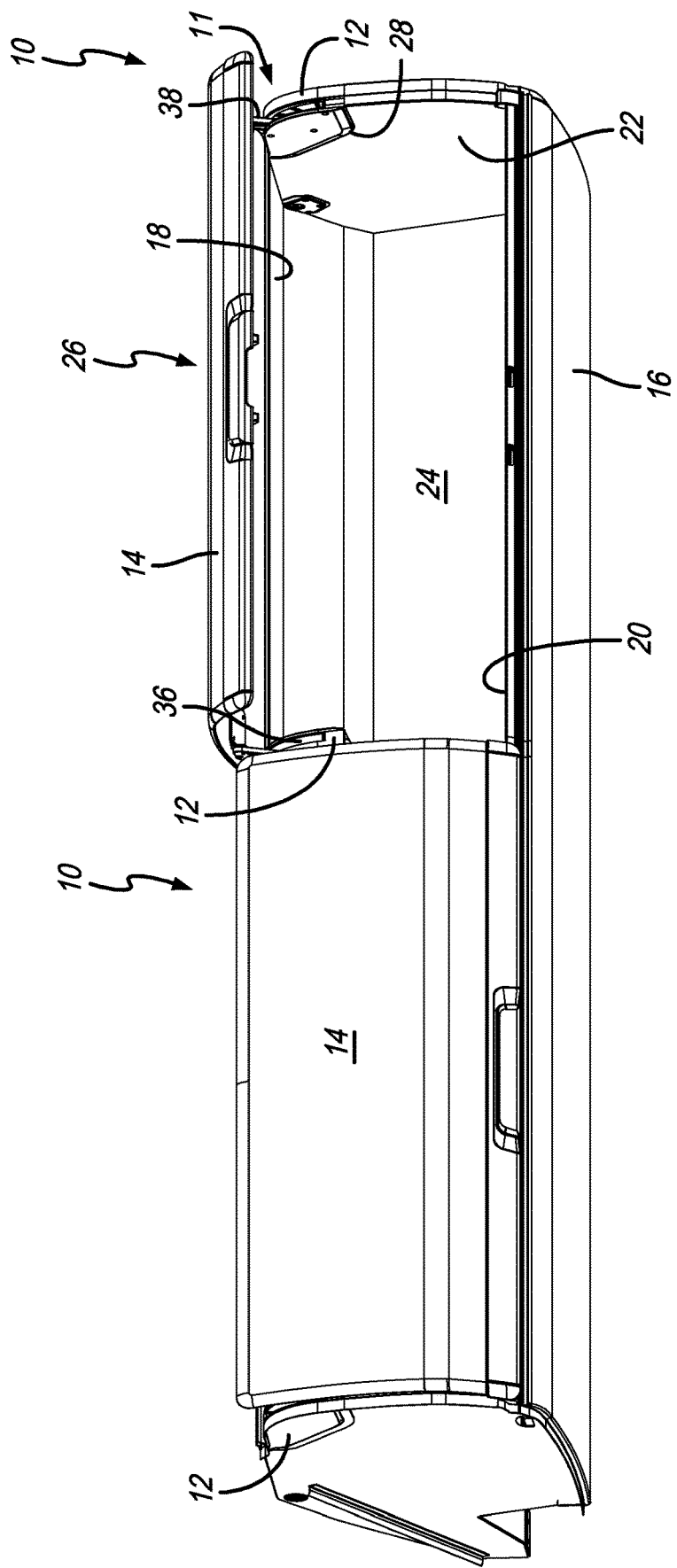
FIG. 1 is a perspective view of an overhead storage bin with two doors that each include a hinge system in accordance with a preferred embodiment of the present invention.
Figure 2:
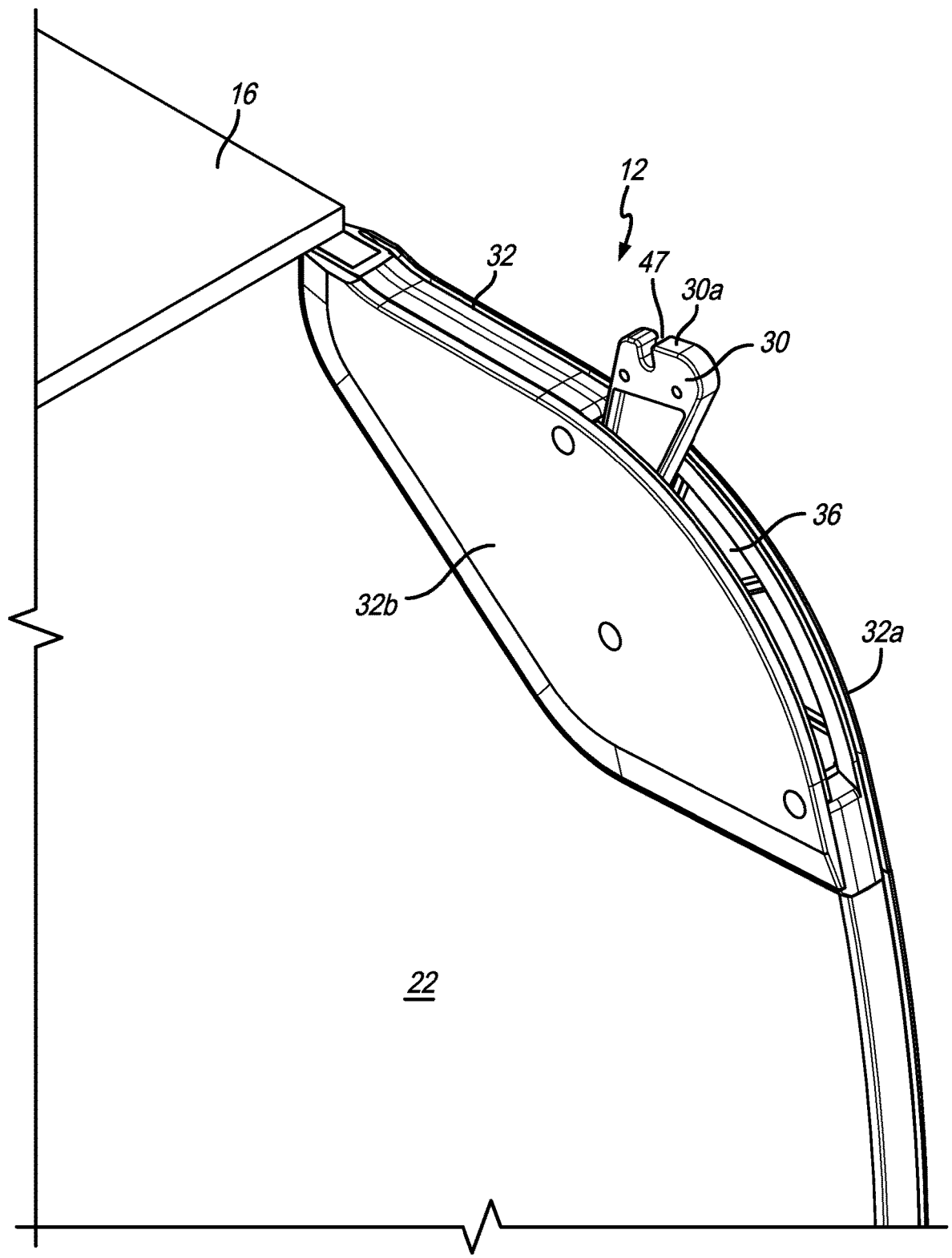
FIG. 2 is a perspective view of one of the hinge assemblies of the hinge system of FIG. 1 with the door removed.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Referring now to the drawings, wherein the showings are for purposes of illustrating the present invention and not for purposes of limiting the same, FIGS. 1-6 show an overhead storage bin 10 that includes a hinge system 11 with first and second hinge assemblies 12 that can be used for opening and closing the door 14 of the overhead storage bin 10. Generally, the overhead storage bin 10 includes a bin housing 16 that includes a top 18, a bottom 20 and first and second end panels 22 that cooperate to define a bin interior 24. The bin 10 also includes a latch system 26 that maintains the door 14 in the closed position. As shown in FIG. 1, the door 14 is movable with respect to the bin housing 16 between a closed position and an open position.

Figure 3:
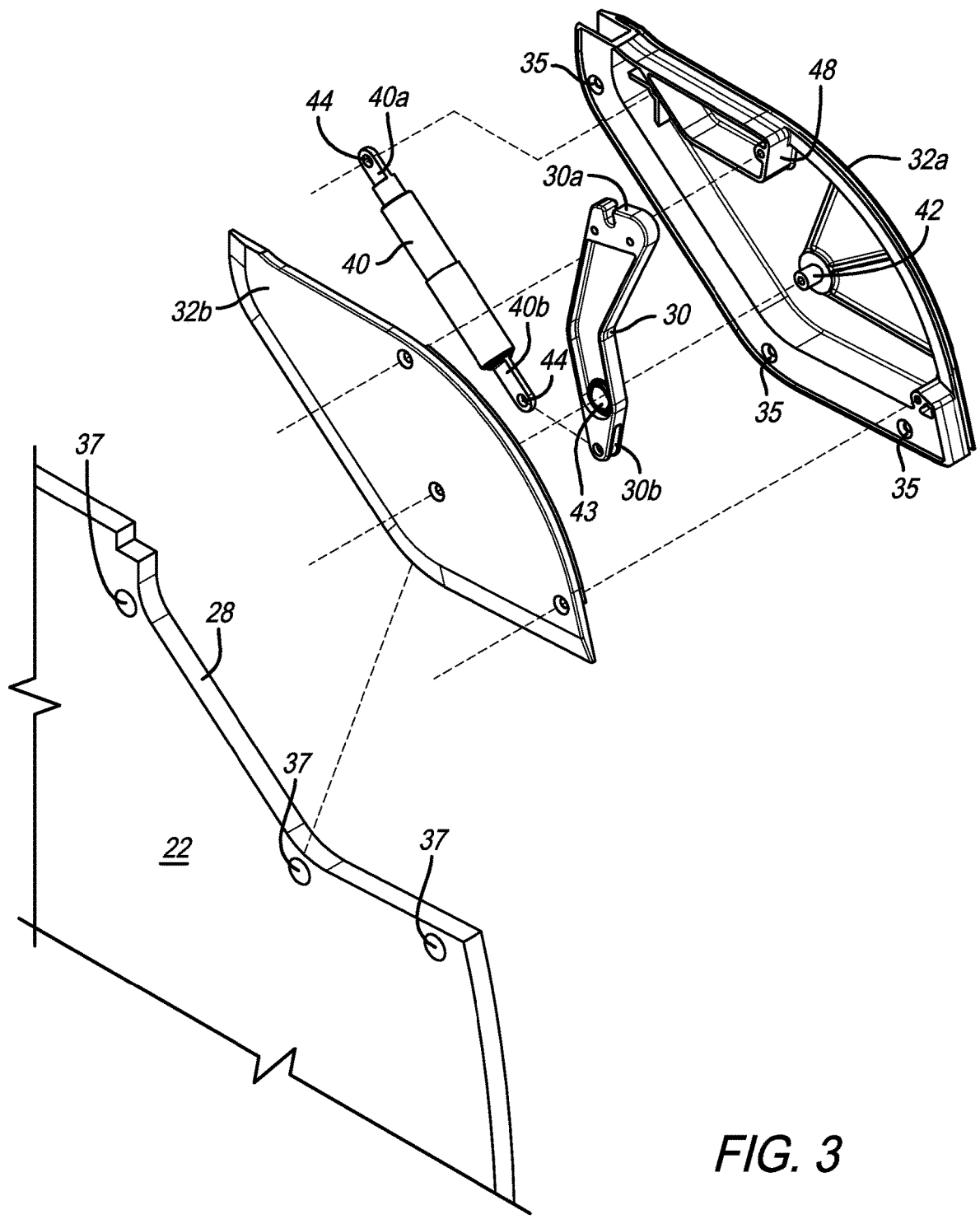
FIG. 3 is an exploded view of the hinge assembly.

In a preferred embodiment, the right and left or first and second hinge assemblies 12 are connected to the first and second end panels 22. As shown in FIG. 3, the first and second hinge assemblies 12 can be positioned in a cut-out 28 defined in each of the end panels 22. For example, the cut-outs 28 can be defined in the upper inboard corner of the end panels 22, as shown in FIG. 1. Threaded fasteners can be inserted through openings 35 in the housing 32 and openings 37 in the end panel 22. The hinge assemblies 12 each include an arm 30 that is connected to the door 14. The arms 30 travel with the door 14 between the closed and open position (and to the over-travel position, as described below). It will be appreciated that the door 14 and arms 30 are biased to the open position. Therefore, when the latch system 26 is released, the door automatically moves to the open position.

The hinge assembly 12 will now be described. As shown in FIGS. 2-6, the hinge assembly 12 includes a housing 32 having first and second housing members 32a and 32b that include a hinge space 34 defined therein. The housing 32 also includes a hinge opening 36 is defined therein that communicates the hinge space 34 with the exterior of the housing 32. The hinge assembly 12 also includes an arm 30 pivotably connected to the housing 32 within the hinge space 34. The arm 30 includes first and second ends 30a and 30b and is pivotable between a closed position (FIG. 4) and an open position (FIG. 5) that coincide with the closed and open positions of the door 14. The arm 30 extends through the hinge opening 36 and the first end 30a of the arm 30 is positioned outside of the housing. The hinge assembly 12 also includes a dampener 40 that includes first and second ends 40a and 40b. The first end 40a is connected to the housing 32 and the second end 40b is connected to the arm 30. The dampener 40 biases the arm 30 from the closed position to the open position. Therefore, in the hinge system 11, the first and second dampeners bias the arms and the door to the open position.

Figure 4:
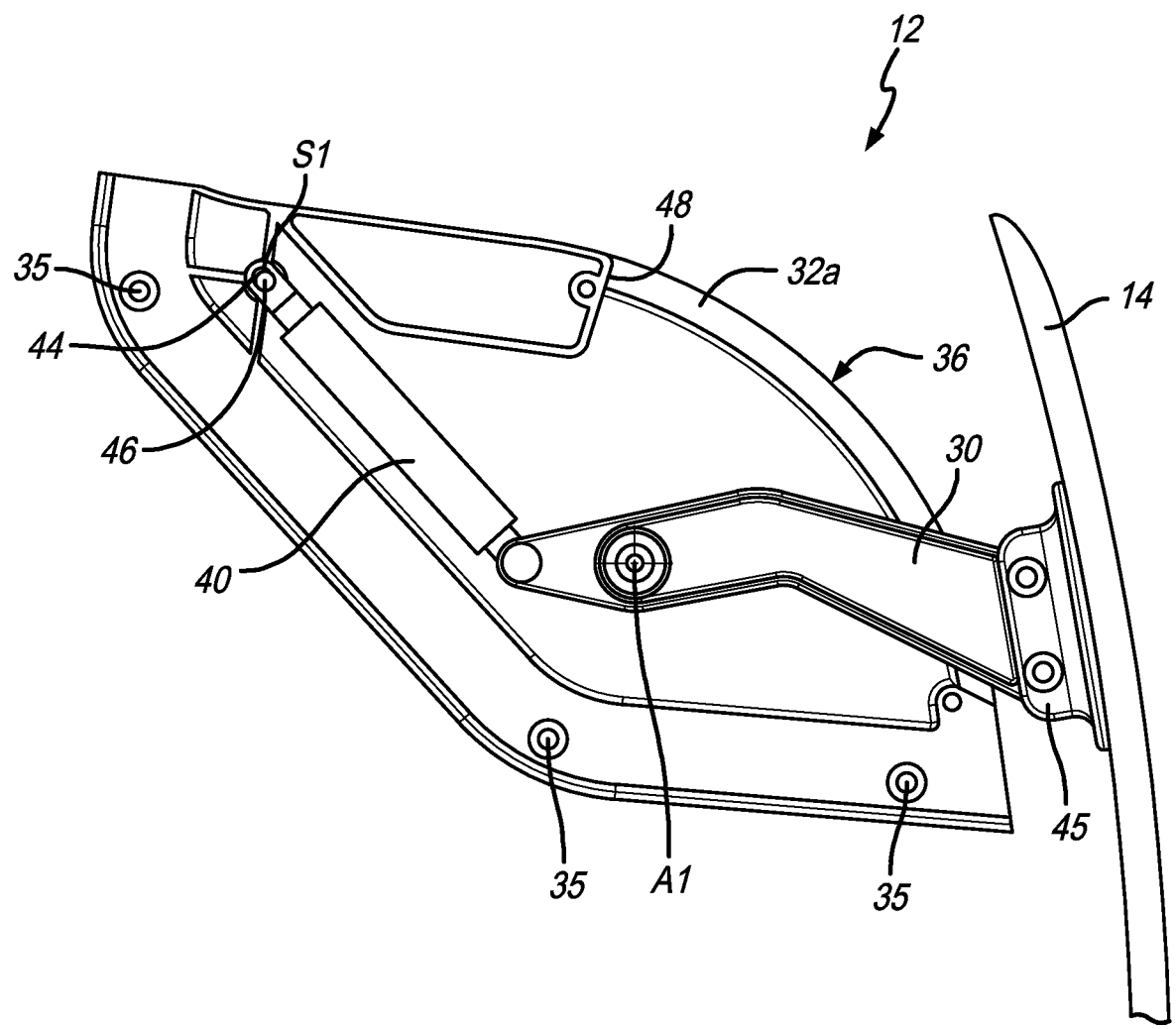
FIG. 4 is a side elevational view of the hinge assembly with the second housing member removed and the arm in the closed position.

As shown in FIG. 4, in a preferred embodiment, the second end 40b of the dampener 40 is connected to the second end 30b of the arm 30. In another embodiment, the dampener can be connected to the arm at a point between its first and second ends. The arm 30 is pivotably connected to the housing 32 (and one of the first or second housing members 32a and 32b) about a pivot axis A1 that is located between the first and second ends 30a and 30b of the arm 30. Preferably, the housing 32 includes a pivot axle 42 that extends from one of the inner and outer housing members 32a and 32b (or that extends between them) and that defines the pivot axis A1. The pivot axle 42 is received in a pivot opening 43 defined in the arm 30. The door 14 can be attached to the arms 30 via brackets 45. The brackets 45 can connect to the arms 30 via a pocket 47 defined therein.

Figure 6:
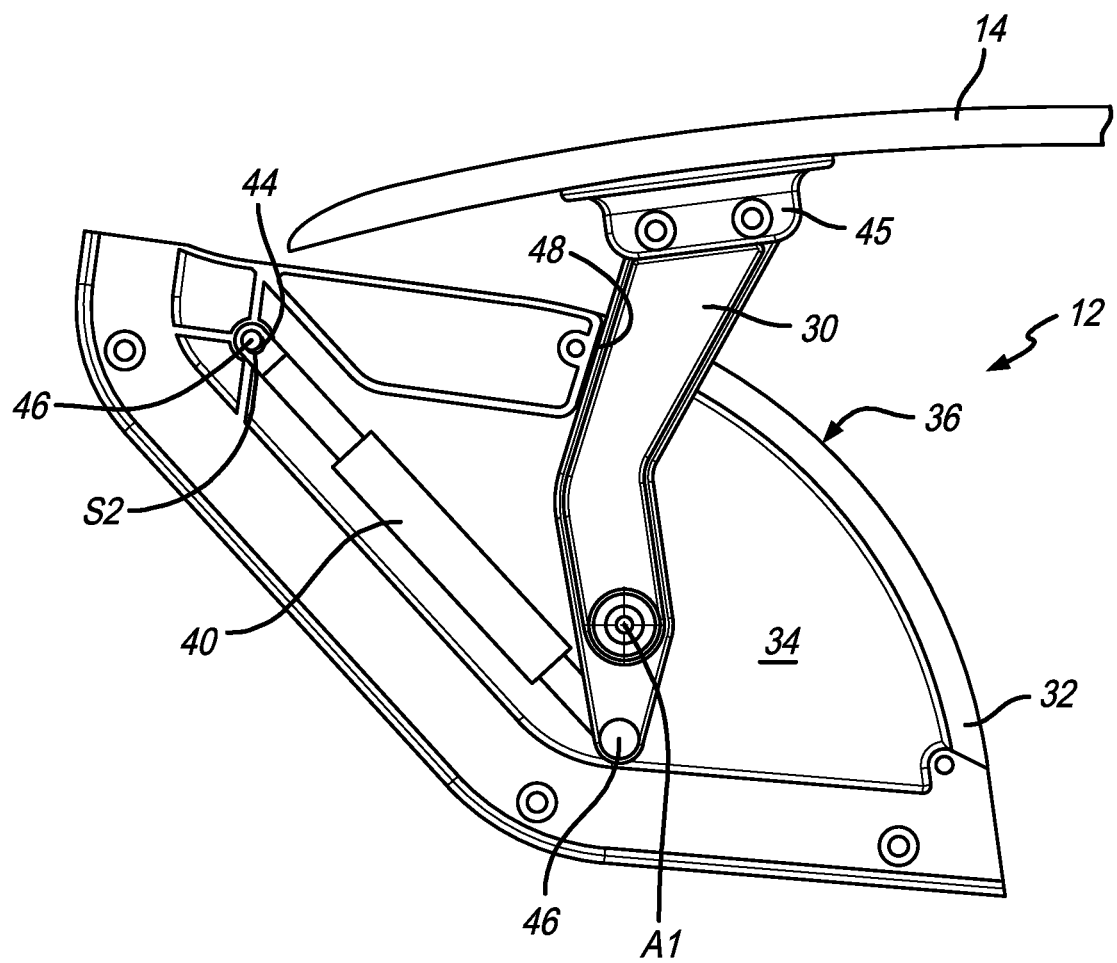
FIG. 6 is a side elevational view of the hinge assembly with the second housing member removed and the arm in the over-travel position.

In a preferred embodiment, the arm 30 is pivotable between the closed position, the open position and an over-travel position (FIG. 6). The arm 30 is biased from the over-travel position to the open position. In a preferred embodiment, the dampener 40 biases the arm 30 from the over-travel position to the open position. In a preferred embodiment, the housing includes a stop member 48 that the arm 30 contacts when it is pushed or moves to the over-travel position. The stop member 48 preferably protrudes outwardly from one of the housing members.

Figure 5:
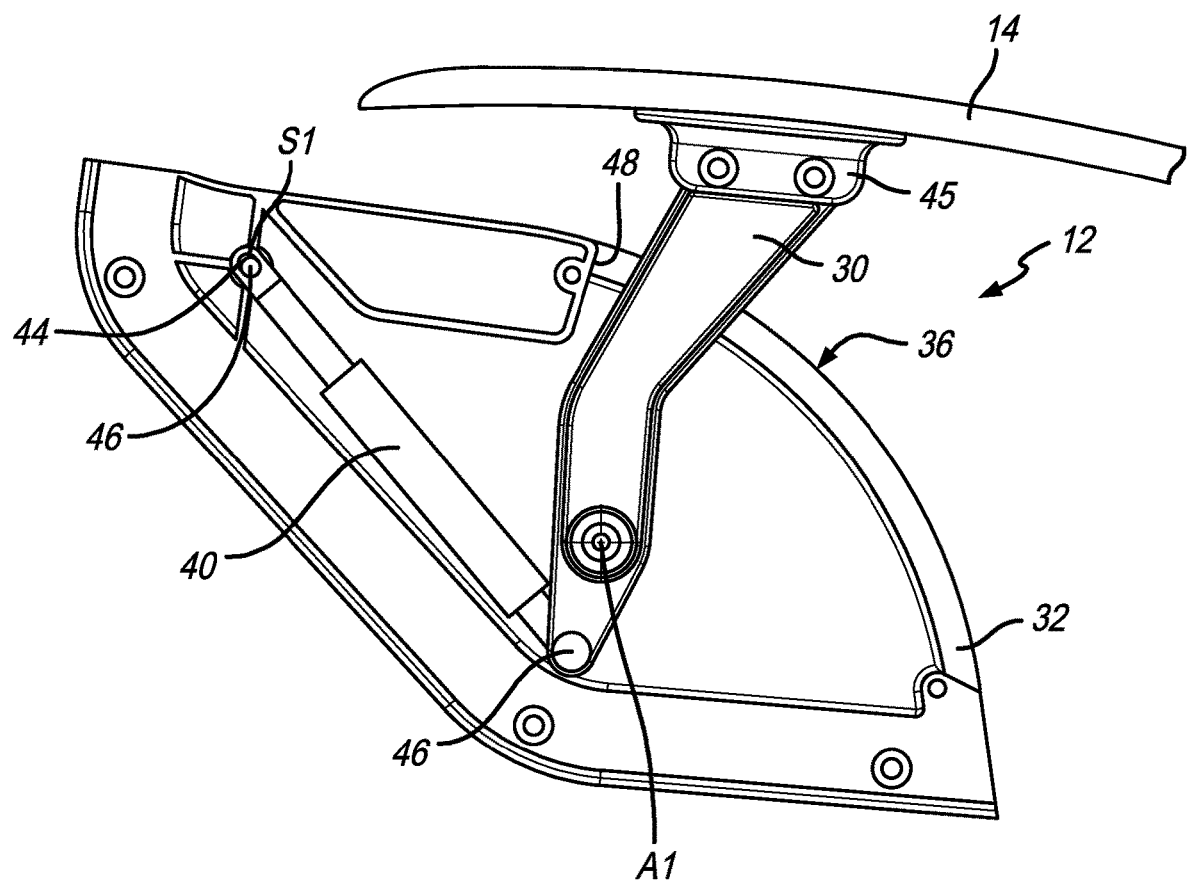
FIG. 5 is a side elevational view of the hinge assembly with the second housing member removed and the arm in the open position.

As shown in FIG. 3, the first and second ends 40a and 40b of the dampener 40 include connection openings 44 defined therein. Preferably, the connection openings 44 are larger than the connection members 46 that fit therein, thereby providing clearance and allowing the dampener 40 to move in an axial direction. FIGS. 4 and 5 shows the dampener 40 in the normal position (note the space S1) between the connection member 46 and the connection opening 44. In FIG. 4 the dampener 40 is collapsed and in FIG. 5, the dampener 40 is expanded to its maximum stroke. However, in both collapsed and expanded configurations space S1 is evident due to the position of the ends of the dampener with the respective connection members. FIG. 6 shows the dampener 40 in the over-travel position (note the space S2) between the connection member 46 and the connection opening 44. In use, when the door 14 and arms 30 are pushed to the over-travel position, the entirety of the expanded dampeners 40 move axially between the normal position and the over-travel position. When the door 14 is released, the dampeners 40 move back to the normal position.

Figure 7:
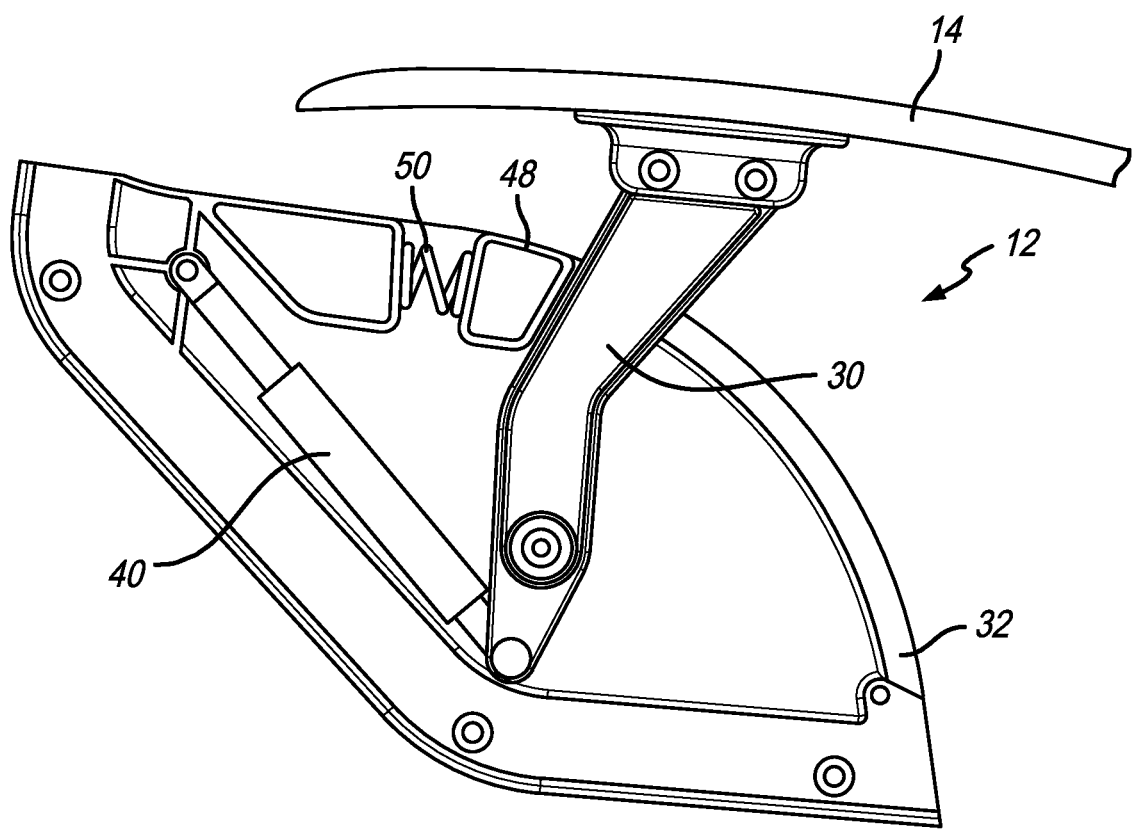
FIG. 7 is a side elevational view of a hinge assembly in accordance with another preferred embodiment of the present invention with the arm in the open position and the stop member in the first stop position.
Figure 8:
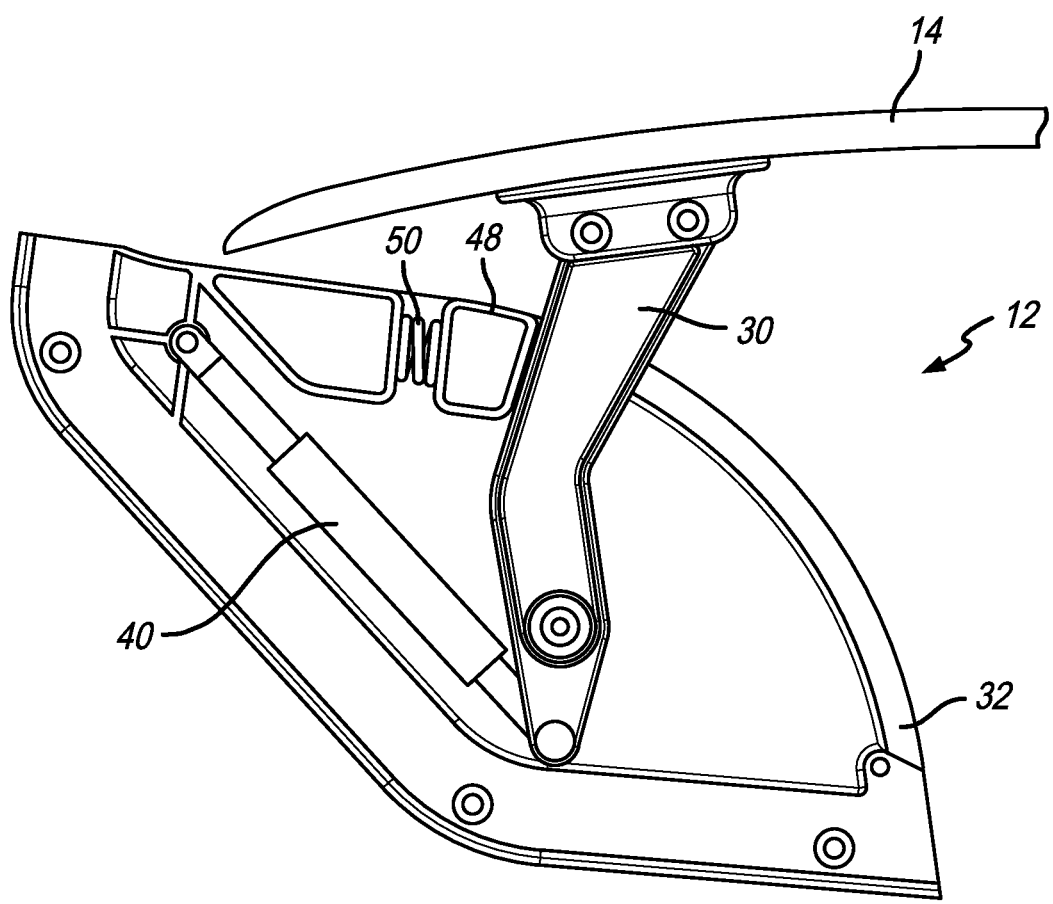
FIG. 8 is a side elevational view of the hinge assembly of FIG. 7 with the arm in the over-travel position and the stop member in the second stop position.

FIGS. 7-8 show an embodiment of the invention where the stop member 48 is movable and biases the arm 30 from the over-travel position to the open position. In this embodiment, the stop member 48 is movable between a first stop position (FIG. 7) and a second stop position (FIG. 8). In use, the arm 30 contacts the stop member 48 (and is therefore stopped) when it reaches the open position. Then, when a user or luggage pushes the door 14 to the over-travel position, the stop member 48 moves to the second stop position. When the door is released, the stop member 48 pushes the door or biases the door back to the open position. This can be accomplished by including a spring 50 or springs that biases the stop member 48 to the first stop position and is compressed when the arm 30 pushes against the stop member 48.

In an embodiment, the over-travel position can be omitted. In another embodiment, stop member can only be included on one of the first and second hinge assemblies. In another embodiment, the housings can comprise or be unitary with the end panels.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. An overhead storage bin comprising:
    a bin housing that includes a top, a bottom and first and second end panels that cooperate to define a bin interior,
    a door that is movable with respect to the bin housing between a closed position, an open position and an over-travel position, the open position is located between the closed and over-travel positions,
    a first hinge assembly connected to the first end panel, the first hinge assembly including
        a first housing that includes a first connection member and a first hinge space defined therein, a first hinge opening is defined in the first housing, and the first hinge opening communicates the first hinge space with an exterior of the first housing,
        a first arm pivotably connected to the first housing within the first hinge space, the first arm is pivotable between a closed position, an open position and an over-travel position, the first arm extends through the first hinge opening and a first end of the first arm is positioned outside of the first housing, the first end of the first arm is connected to the door, and
        a first dampener that includes first and second ends, the first end is connected to the first housing and the second end is connected to the first arm, the first dampener biases the first arm from the closed position to the open position, the first end of the first dampener includes a first connection opening defined therein that receives the first connection member therein, the first connection opening has a larger dimension than the first connection member, such that the first connection member is movable within the first connection opening, the second end of the first dampener moves axially when the door moves from the closed position to the open position and both of the first and second ends of the first dampener move axially when the door moves from the open position to the over-travel position,
    a second hinge assembly connected to the second end panel, the second hinge assembly including
        a second housing that includes a second connection member and a second hinge space defined therein, a second hinge opening is defined in the second housing, and the second hinge opening communicates the second hinge space with an exterior of the second housing,
        a second arm pivotably connected to the second housing within the second hinge space, the second arm is pivotable between a closed position, an open position and an over-travel position, the second arm extends through the second hinge opening and a first end of the arm is positioned outside of the second housing, the first end of the second arm is connected to the door, and
        a second dampener that includes first and second ends, the first end is connected to the second housing and the second end is connected to the second arm, the second dampener biases the second arm from the closed position to the open position, the first end of the second dampener includes a second connection opening defined therein that receives the first second member therein, the second connection opening has a larger dimension than the second connection member, such that the second connection member is movable within the second connection opening, the second end of the second dampener moves axially when the door moves from the closed position to the open position and both of the first and second ends of the second dampener move axially when the door moves from the open position to the over-travel position, and
    a latch that maintains the door in the closed position, when the latch is disengaged the first and second dampeners expand to move the door to the open position.

2. The overhead storage bin of claim 1 the first arm includes a second end opposite the first end, the second end of the first dampener is connected to the second end of the first arm, the first arm is pivotably connected to the first housing about a pivot axis, the pivot axis is located between the first and second ends of the first arm, and the second arm includes a second end opposite the first end, the second end of the second dampener is connected to the second end of the second arm, the second arm is pivotably connected to the second housing about a pivot axis.

3. The overhead storage bin of claim 1 the first housing includes a first stop member, the first arm contacts the first stop member when the first arm is in the over-travel position, the second housing includes a second stop member, the second arm contacts the second stop member when the second arm is in the over-travel position.

4. The overhead storage bin of claim 3 the first arm includes a second end opposite the first end, the second end of the first dampener is connected to the second end of the first arm, the first arm is pivotably connected to the first housing about a pivot axis, the pivot axis is located between the first and second ends of the first arm, and the second arm includes a second end opposite the first end, the second end of the second dampener is connected to the second end of the second arm, the second arm is pivotably connected to the second housing about a pivot axis.

5. The overhead storage bin of claim 4 the first housing includes first inner and first outer housing members that cooperate to define the first hinge space therebetween, the pivot axis is defined by a first pivot axle that extends from one of the first inner and first outer housing members, and the first stop member is secured to one of the first inner and first outer housing members, the second housing includes second inner and second outer housing members that cooperate to define the second hinge space therebetween, the pivot axis is defined by a second pivot axle that extends from one of the second inner and second outer housing members, and the second stop member is secured to one of the second inner and second outer housing members.

6. The overhead storage bin of claim 1 the first housing includes a first stop member that is movable between a first stop position and a second stop position, the first stop member is biased to the first stop position, the first arm contacts the first stop member when the first arm is in the open position, the first stop member moves to the second stop position when the first arm is moved to the over-travel position, the second housing includes a second stop member that is movable between a first stop position and a second stop position, the second stop member is biased to the first stop position, the second arm contacts the second stop member when the second arm is in the open position, and the second stop member moves to the second stop position when the second arm is moved to the over-travel position.

* * * * *